United States Patent
Strack

(10) Patent No.: US 8,820,570 B2
(45) Date of Patent: Sep. 2, 2014

(54) CLAMPED LINER-BOSS CONNECTION

(71) Applicant: GM Global Technology Operations LLC, Detroit, MI (US)

(72) Inventor: Ludger Strack, Heidenrod (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/761,535

(22) Filed: Feb. 7, 2013

(65) Prior Publication Data

US 2013/0152371 A1 Jun. 20, 2013

Related U.S. Application Data

(63) Continuation of application No. 12/720,970, filed on Mar. 10, 2010, now Pat. No. 8,397,938.

(51) Int. Cl.
*F17C 1/02* (2006.01)
*F17C 1/10* (2006.01)

(52) U.S. Cl.
USPC .............................. 220/586; 220/582; 220/601

(58) Field of Classification Search
USPC .................... 220/586, 581, 582, 588, 601
See application file for complete search history.

(56) References Cited

U.S. PATENT DOCUMENTS

| | | | |
|---|---|---|---|
| 5,253,778 A | 10/1993 | Sirosh | |
| 5,429,845 A * | 7/1995 | Newhouse et al. | 428/34.1 |
| 5,518,141 A | 5/1996 | Newhouse et al. | |
| 5,551,590 A * | 9/1996 | Mazur et al. | 220/23.83 |
| 5,979,692 A * | 11/1999 | West | 220/586 |
| 6,186,356 B1 * | 2/2001 | Berkley et al. | 220/582 |
| 7,287,663 B2 * | 10/2007 | Vandal et al. | 220/586 |
| 7,861,887 B2 * | 1/2011 | Ota et al. | 220/581 |
| 7,959,027 B2 * | 6/2011 | Weber | 220/588 |
| 2004/0173618 A1 * | 9/2004 | Suzuki et al. | 220/581 |
| 2008/0251520 A1 * | 10/2008 | Ota et al. | 220/586 |

FOREIGN PATENT DOCUMENTS

WO WO 2008153414 A1 * 12/2008

\* cited by examiner

*Primary Examiner* — Mickey Yu
*Assistant Examiner* — Niki Eloshway
(74) *Attorney, Agent, or Firm* — Fraser Clemens Martin & Miller LLC; J. Douglas Miller

(57) ABSTRACT

A pressure vessel for storing a fluid, the pressure vessel including an annular inner boss having an inner surface and an outer surface, the inner surface forming a passage adapted to receive a utility device therein, wherein the inner boss includes a liner channel formed intermediate the inner surface and the outer surface, a vessel liner having a portion thereof disposed in the liner channel of the inner boss, and an outer boss secured to the outer surface of the inner boss.

18 Claims, 4 Drawing Sheets

CLAMPED LINER-BOSS CONNECTION

CROSS-REFERENCE TO RELATED APPLICATIONS

This application is a continuation application of U.S. application Ser. No. 12/720,970, filed on Mar. 10, 2010. The entire disclosure of the above application is incorporated herein by reference.

FIELD OF THE INVENTION

The invention relates to pressure vessels. More particularly, the invention is directed to a boss adapter and a method for forming a pressure vessel including the boss adapter.

BACKGROUND OF THE INVENTION

A pressure vessel for storing a pressurized fluid medium (such as hydrogen) typically includes a pressure chamber which contains the pressurized fluid medium that is moved in a controlled manner in or out of the vessel. In certain designs, the pressure vessel includes an inner plastic liner with two metal mouthpieces (bosses) arranged on opposite ends, and a filament wound outer shell to support the inner vessel liner.

Typically, the vessel liner is manufactured using a conventional injection molding, blow molding, rotational molding process, or thermoforming process. For example, the following patent documents describe a vessel liner (WO 1999/039896 Dulisse, JMK; WO 2007/079971 Müller, Xperion; DE 19526154 Lange, Mannesmann etc.; and WO 1999/013263 Jensen, Raufoss), each of which is incorporated herein by reference in its entirety.

To permit controlled movement of fluids in or out of the pressure chamber, the vessel is typically configured with a pressure chamber orifice and a boss is fitted in the orifice. The boss is threaded or otherwise shaped for connection to nozzles, valves, gauges, tubes, and similar fixtures which direct and control fluid flow. Accordingly, the boss is formed of a metal or another conventional material having desired properties.

The boss typically includes a cylindrical neck with a longitudinal passage that provides fluid communication between the pressure chamber and the environment outside the vessel. In certain designs, a flange is secured to one end of the neck. The flange, which is larger than the pressure chamber orifice, is secured to the liner of the pressure vessel to militate against relative movement between the boss and the liner.

First, it is desirable to militate against a translation of the boss in respect of the liner. That is, the boss should not be permitted to move along the central longitudinal axis of the neck such that it falls completely inside the pressure chamber. Nor should the boss be allowed to move in the opposite direction and separate itself from the vessel.

Second, it is desirable to militate against a rotation of the boss in respect of the liner. That is, the boss should not be permitted to rotate with respect to the liner about the central axis of the neck or about the pressure chamber orifice. Thus, when the vessel is held and an attempt is made to thread a fixture into the threaded boss, the boss should not thwart the attempt by rotating with respect to the liner.

The problem therefore arises of how to securely attach the boss to a non-metallic liner to prevent translation and rotation of the boss while providing a substantially fluid-tight seal between the boss and the vessel liner. One approach simply relies on the internal pressure in the vessel to attach the boss and liner. Although this pressure may suffice to create a seal between the boss and the non-metallic liner in some vessels, and may also prevent boss translation, it generally does not prevent boss rotation.

Another approach positions the boss between two lips of a partially bifurcated liner. Such a liner includes two lip layers disposed about the circumference of the pressure chamber orifice. The boss flange is positioned in an annular recess between the lip layers and is encapsulated by the liner lips. No adhesive is used between the boss and the liner lips. Although this approach limits boss translation, it fails to substantially restrict boss rotation.

A different approach to securing the boss to the liner includes placing a layer of adhesive between the boss and the liner. The adhesive bonds the boss and the liner together, at least initially. Unfortunately, some adhesives deteriorate over time. Thus, the adhesive may not last the entire service life of the vessel, particularly if pressure and thermal stresses or chemical contaminants are introduced into the vessel.

It is also difficult to bond metal bosses to certain thermoplastic materials such as nylons and polyolefins, because petroleum-based thermoplastic materials inherently have a so-called "lubricated" surface. The use of adhesives to bond metal to such materials typically involves elaborate surface preparation and treatment steps to ensure an adequate bond. The repeatability of adequate bonding also becomes operator sensitive, and hence, problematic in large volume manufacturing.

It would be desirable to develop a boss for use with a pressure vessel and a method for coupling the boss to a vessel liner of the pressure vessel, wherein the boss is securely coupled to the vessel liner to form a substantially fluid-tight seal therebetween.

SUMMARY OF THE INVENTION

Concordant and consistent with the present invention, a boss for use with a pressure vessel and a method for coupling the boss to a vessel liner of the pressure vessel, wherein the boss is securely coupled to the vessel liner to form a substantially fluid-tight seal therebetween, has surprisingly been discovered.

In one embodiment, a pressure vessel for storing a fluid comprises: an annular inner boss having an inner surface and an outer surface, the inner surface forming a passage adapted to receive a utility device therein, wherein the inner boss further includes a liner channel formed intermediate the inner surface and the outer surface; a vessel liner having a portion thereof disposed in the liner channel of the inner boss; and an outer boss secured to the outer surface of the inner boss.

In another embodiment, a pressure vessel for storing a fluid comprises: an annular inner boss having an inner surface and an outer surface, wherein the inner boss includes a liner channel formed intermediate the inner surface and the outer surface; a vessel liner having a portion thereof disposed in the liner channel of the inner boss; and a outer boss including an inner boss channel for receiving the inner boss, wherein at least one of the inner surface and the outer surface of the inner boss is disposed adjacent a portion of the inner boss channel.

The invention also provides methods for producing a pressure vessel.

One method comprises the steps of forming a vessel liner with an aperture formed therein; providing an inner boss having a liner channel formed therein, the liner channel adapted to receive a portion of the vessel liner therein; disposing the vessel liner in the liner channel of the inner boss;

clamping the inner boss to a portion of the vessel liner; and providing an outer boss secured to the inner boss.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
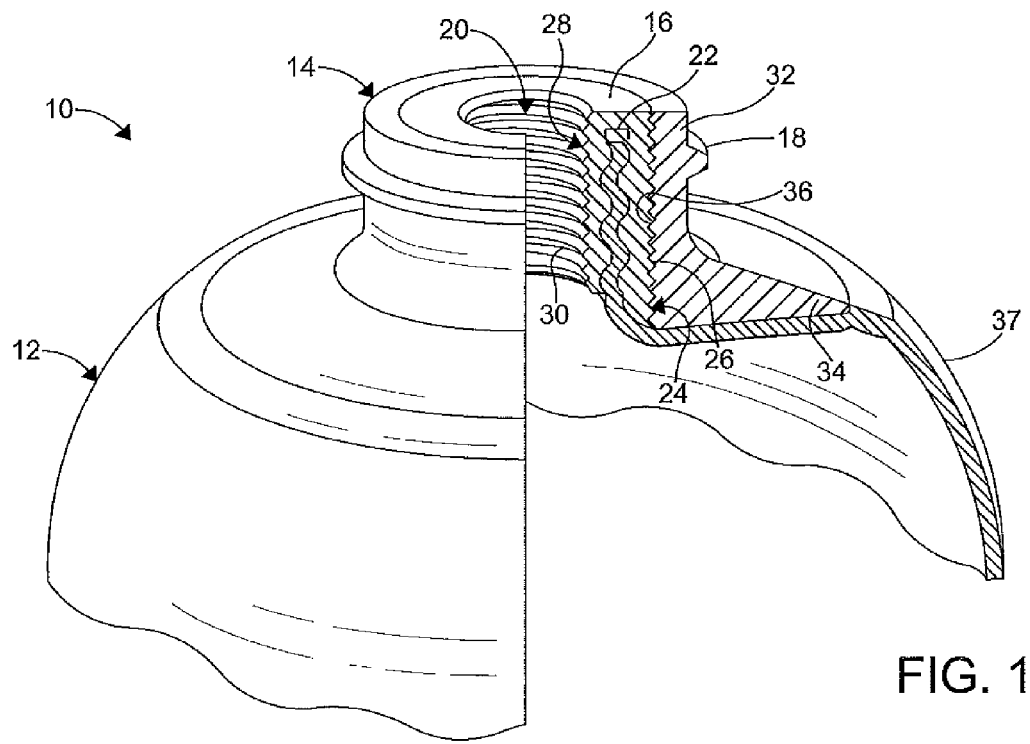
FIG. 1 is a fragmentary perspective view of a pressure vessel according to an embodiment of the present invention, a portion of the pressure vessel shown in section.

FIG. 1 illustrates a pressure vessel 10 according to an embodiment of the present invention. As shown, the pressure vessel 10 includes a vessel liner 12 and a boss 14.

The vessel liner 12 is typically formed by a blow molding process as is known in the art. However, other molding and forming methods may be used to produce the vessel liner 12 such as injection molding, stretch molding, blow molding, and rotational molding, for example. As a non-limiting example, the vessel liner 12 is formed from a thermoplastic material. However, other plastics and non-metallic materials may be used. It is understood that the vessel liner 12 may be formed using a multilayer or single layer material structure and may further include a barrier layer, for example.

The boss 14 includes an inner boss 16, referred to as a clamp component, and an outer boss 18. The boss 14 further includes a passage 20 formed therein to provide a fluid communication between a pressure chamber defined by the pressure vessel 10 and an environment outside the pressure vessel 10. It is understood that the passage 20 may have any size, diameter, and shape.

The inner boss 16 is typically formed from a metal. However, other materials such as plastic, rubber, and resin based materials may be used. As shown, the inner boss 16 is in a "clamped" position and has a substantially inverted "U" shape having a liner channel 22 for receiving the vessel liner 12 therein. However, it is understood that the inner boss 16 may be formed to have a substantially inverted "V" shape, wherein a width of the liner channel 22 is pre-determined to receive a portion of the vessel liner 12. It is further understood that the liner channel 22 may be adapted to secure a vessel liner having an inconstant wall thickness. As a non-limiting example, the liner channel 22 may have a serpentine or "wavy" shape to bend the vessel liner 12 in alternating directions. However, it is understood that the liner channel 22 may have any shape and size and may include retaining elements such as protrusions or "teeth" to secure the vessel liner 12.

In the embodiment shown, an outer surface 24 of the inner boss 16 includes a first coupling element 26 for engaging and securing the inner boss 16 with the outer boss 18. As a non-limiting example, the coupling element 26 shown is a substantially helical thread or groove. However, other means for engaging and securing the inner boss 16 and the outer boss 18 may be used. An inner surface 28 of the inner boss 16 defines the passage 20 and includes a second coupling element 30. The second coupling element 30 engages and secures various utility devices such as pressure regulators, nozzles, valves, gauges, tubes, and similar fixtures which direct and control fluid flow in and out of the pressure vessel 10. As a non-limiting example, the second coupling element 30 shown is a substantially helical thread or groove formed on the inner surface 28 of the inner boss 16. However, other means for engaging and securing the utility devices and the boss 14 may be used.

The outer boss 18 is typically formed from a metal. However, other materials such as plastic, rubber, and resin may be used. It is understood that the inner boss 16 and the outer boss 18 may be formed from similar or different materials. The outer boss 18 includes a neck portion 32 and a shoulder portion 34. It is understood that the neck portion 32 and the shoulder portion 34 may have any shape and size.

The neck portion 32 of the outer boss 18 includes a coupling element 36 for engaging the first coupling element 26 of the inner boss 16. As a non-limiting, the coupling element 36 of the outer boss 18 includes a substantially helical thread or groove formed on an inside surface of the neck portion 32 of the outer boss 18. However, other means for engaging and securing the inner boss 16 and the outer boss 18 may be used.

The shoulder portion 34 is shown having a tapered shape with a decreasing thickness toward a periphery thereof. However, it is understood that the shoulder portion 34 may have any shape, size, and configuration, as desired. As a non-limiting example, the shoulder portion 34 may be formed to contour to a portion of the vessel liner 12 and provide a substantially smooth transition between the shoulder portion 34 and an outer surface 37 of the vessel liner 12.

In use, a parison (not shown) of the vessel liner 12 is guided around a blow pin, as known in the art of blow molding. Thereafter, the blow pin introduces air into the parison, thereby expanding the parison into the hollow vessel liner 12. It is understood that other gases or fluids may be used to form the hollow vessel liner 12. After the vessel liner 12 has a desired form, the formed vessel liner 12 is released and any scrap material of the parison is removed by a cutting process known to one skilled in the art of blow molding. It is understood that other blow molding processes may be used to form the vessel liner 12. It is further understood that other molding processes may be used to form the vessel liner 12, such as injection molding and stretch molding known in the art.

Once the vessel liner 12 is formed, a portion of the vessel liner 12 is disposed in the liner channel 22 of the inner boss 16. In certain embodiments, the inner boss 16 having a substantially "V" shape receives a portion of the vessel liner 12 into the liner channel 22. As such, the expanded width or "mouth" of the liner channel 22 allows the vessel liner 12 to be disposed therein. Thereafter, the inner boss 16 is clamped around the vessel liner 12 to squeeze the vessel liner 12 therein. As shown in FIG. 1, the vessel liner 12 is bent and formed to the contour of the liner channel 22 to secure the vessel liner 12 to the inner boss 16. It is understood that any clamping tool may be used to bend the inner boss 16 and thereby "clamp" the vessel liner 12 therein. It is further understood that the vessel liner 12 may be heated prior to the clamping procedure to provide for a more pliable liner material. The outer boss 18 is then coupled to the inner boss 16. As a non-limiting example, the shoulder portion 34 of the outer boss 18 abuts a portion of the vessel liner 12. In certain embodiments, once the inner boss 16 and the outer boss 18 of the boss are coupled together, a utility device or support ring (not shown) is coupled to the second coupling element 30 of the inner boss 16 to provide additional support to the boss 14 and direct and control fluid flow in and out of the pressure vessel 10. Additionally, the boss 14 reinforces the pressure vessel 10 around an orifice formed therein. It is understood that additional coatings and layers such as composites and fibers may be applied to the vessel liner 12 to form a final pressure vessel. As a non-limiting example, the addition layers formed around the vessel liner 12 may be formed by at least one of a winding process, a rotational molding process, and a curing process known in the art. It is further understood that the vessel liner 12 and resultant pressure vessel may have any shape and size determined by the forming process.

Figure 2:
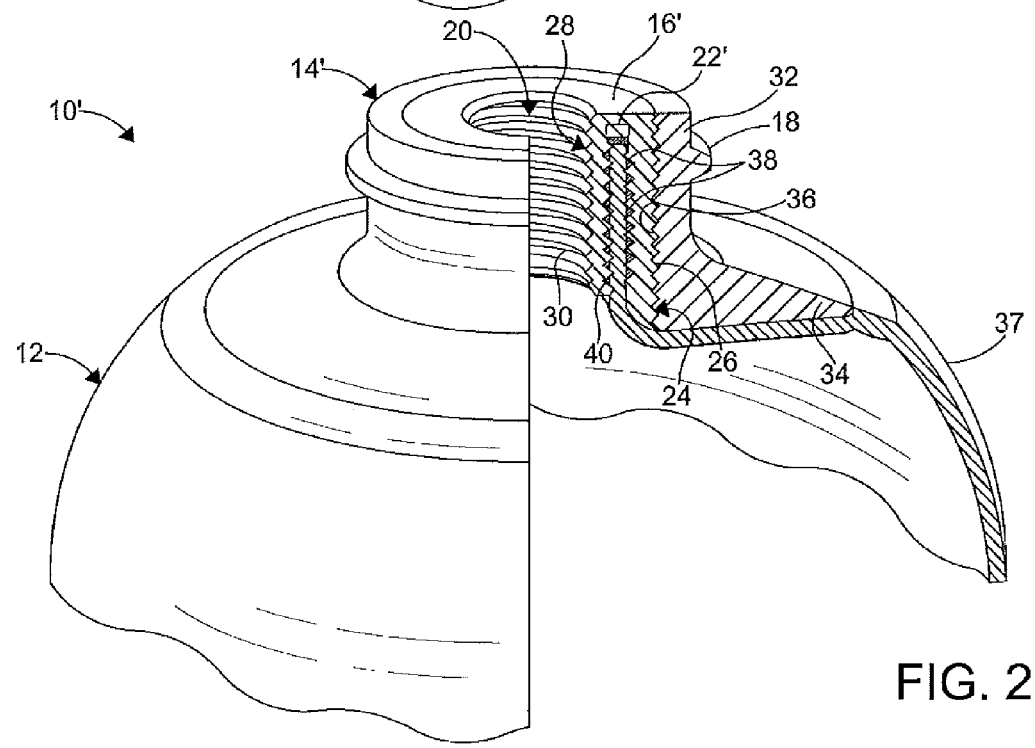
FIG. 2 is a fragmentary perspective view of a pressure vessel according to another embodiment of the present invention, a portion of the pressure vessel shown in section.

FIG. 2 illustrates a pressure vessel 10' according to another embodiment of the present invention similar to the pressure vessel 10 of FIG. 1, except as described below. Structure repeated from the description of FIG. 1 includes the same reference numeral. Variations of structure shown in FIG. 1 include the same reference numeral and a prime (') symbol.

As shown, the liner channel 22' includes a plurality of protrusions 38 or teeth to engage and secure the vessel liner 12 therein. Additionally, a sealing material 40 is disposed in the liner channel 22' to provide a substantially fluid-tight seal between the inner boss 16' of the boss 14' and the vessel liner 12.

In use, the formed vessel liner 12 is disposed in the liner channel 22 of the inner boss 16'. In certain embodiments, the inner boss 16' having a substantially "V" shape receives a portion of the vessel liner 12 into the liner channel 22'. As such, the expanded width or "mouth" of the liner channel 22' allows the vessel liner 12 to be disposed therein. Thereafter, the inner boss 16' is clamped around the vessel liner 12 to squeeze the vessel liner 12 therein. As shown in FIG. 2, the protrusions 38 engage the vessel liner 12 to secure the vessel liner 12 to the inner boss 16'. It is understood that any clamping tool may be used to bend the inner boss 16' and thereby "clamp" the vessel liner 12 therein. It is further understood that the vessel liner 12 may be heated prior to the clamping procedure to provide for a more pliable liner material. In certain embodiments, the sealing material 40 is injected into a space between the vessel liner 12 and the inner boss 16'. In other embodiments, the sealing material 40 is disposed in the liner channel 22' prior to being clamped to the vessel liner 12. It is understood that any means for applying the sealing material 40 may be used. The outer boss 18 is then coupled to the inner boss 16'. As a non-limiting example, the shoulder portion 34 of the outer boss 18 abuts a portion of the vessel liner 12. In certain embodiments, once the inner boss 16' and the outer boss 18 of the boss are coupled together, a utility device or support ring (not shown) is coupled to the second coupling element 30 of the inner boss 16' to provide additional support to the boss 14' and direct and control fluid flow in and out of the pressure vessel 10'.

Figure 3:
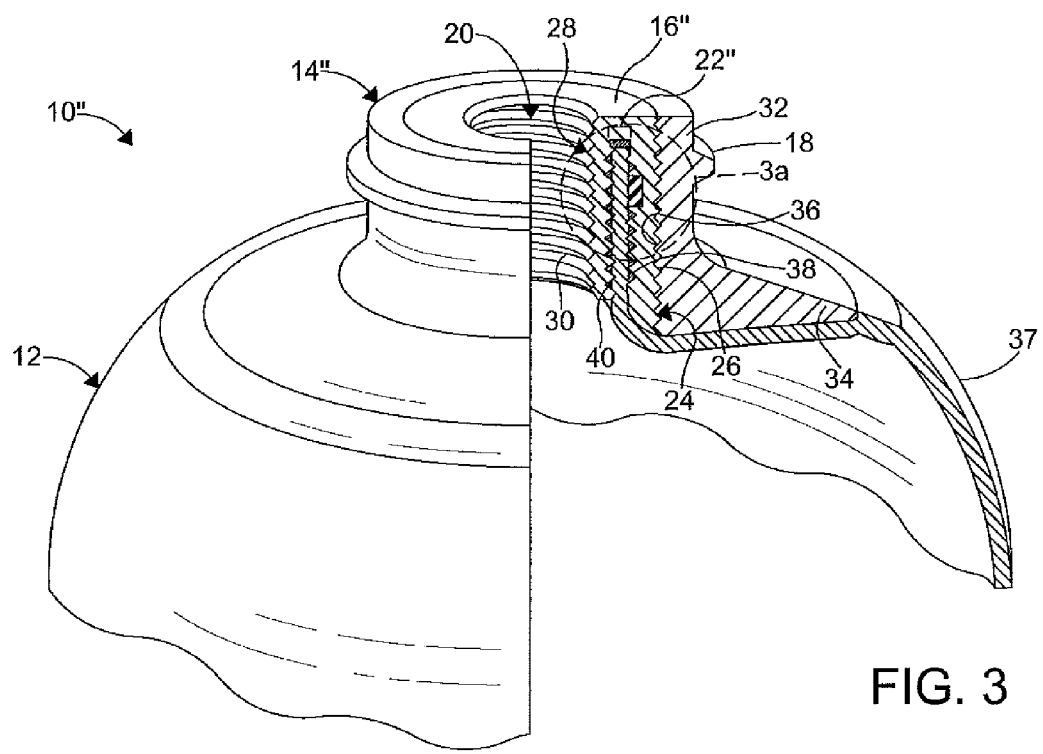
FIG. 3 is a fragmentary perspective view of a pressure vessel according to another embodiment of the present invention, a portion of the pressure vessel shown in section.
Figure 3A:
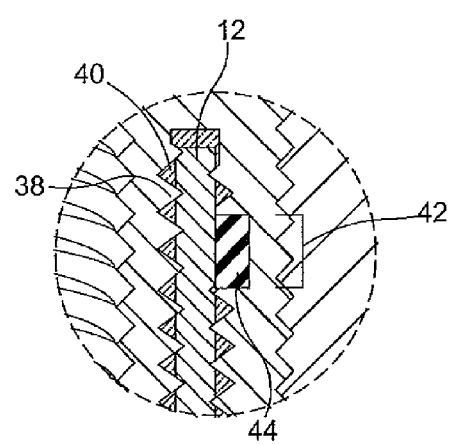
FIG. 3a is an enlarged fragmentary cross-sectional front elevational view of a portion of the pressure vessel illustrated in FIG. 3 and depicted by circle 3a therein.

FIGS. 3 and 3a illustrate a pressure vessel 10" according to another embodiment of the present invention similar to the pressure vessel 10' of FIG. 2, except as described below. Structure repeated from the description of FIG. 2 includes the same reference numeral. Variations of structure shown in FIG. 2 include the same reference numeral and a double-prime (") symbol.

As shown, the inner boss 16" includes a sealing channel 42 formed therein, wherein the sealing channel 42 is an annular channel adapted to receive a sealing element 44. As shown, the inner boss 16" includes a single channel. However, any number of channels and sealing elements may be used. As a non-limiting example, the sealing element 44 is an O-ring formed from at least one of an elastomer and a plastic. However, other materials having desired characteristics may be used such as a rubber, a metal, and an ultra high molecular weight polyethylene (UHMW-PE), for example. As a further example, an encapsulated O-ring may be used, wherein the encapsulated O-ring includes multiple layers formed from various materials such as fluorinated ethylene propylene, fluoroelastomers (FKM), and methyl-vinyl silicone rubber (VMQ), for example. It is understood that the sealing channel 42 and the sealing element 44 may be formed in any position relative to the vessel liner 12 and inner boss 16" and may have any shape as desired.

In use, the sealing element 44 provides a substantially fluid-tight seal between the vessel liner 12 and the inner boss 16". Specifically, as pressure changes within the pressure vessel 10" the sealing element 44 minimizes fluid leakage between the boss 14" and vessel liner 12.

Figure 4:
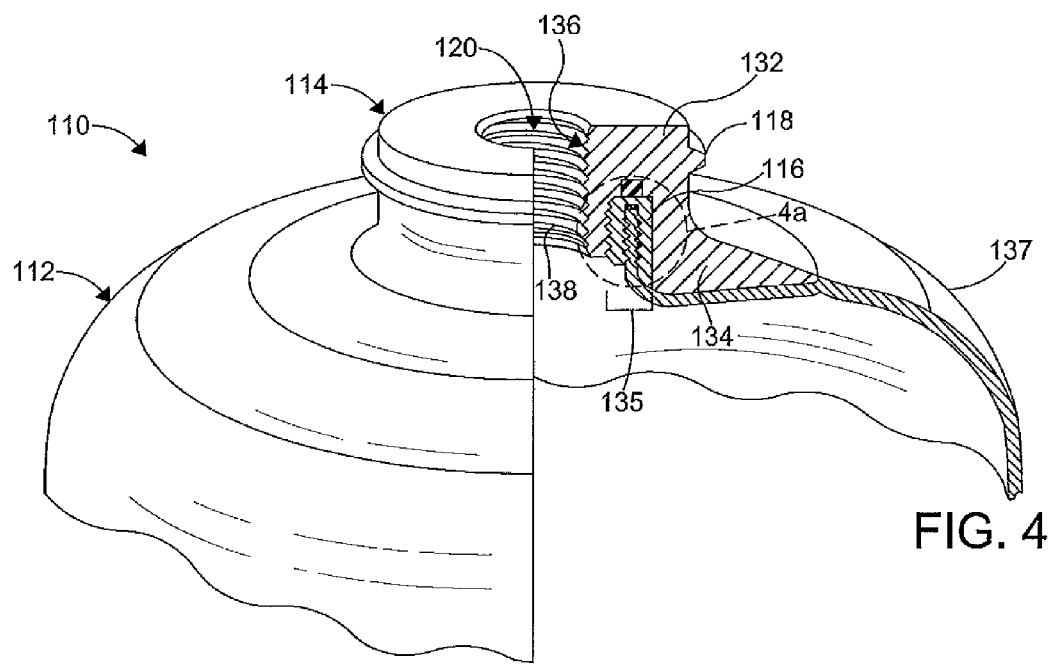
FIG. 4 is a fragmentary perspective view of a pressure vessel according to another embodiment of the present invention, a portion of the pressure vessel shown in section.
Figure 4A:
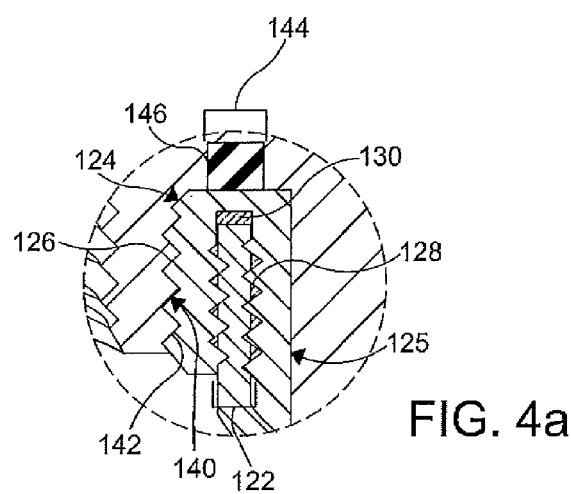
FIG. 4a is an enlarged fragmentary cross-sectional front elevational view of a portion of the pressure vessel illustrated in FIG. 4 and depicted by circle 4a therein.
Figure 5:
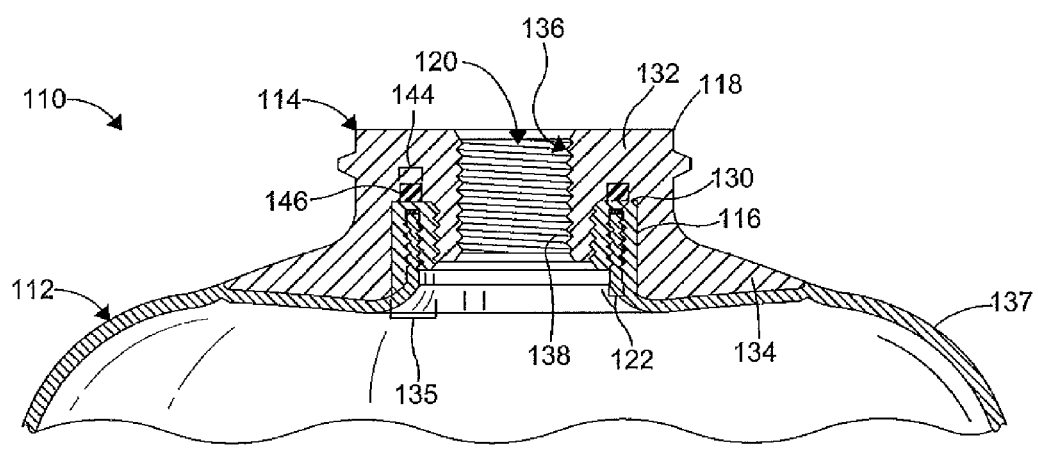
FIG. 5 is a fragmentary cross-sectional view of the pressure vessel of FIG. 4.

FIGS. 4, 4a, and 5 illustrate a pressure vessel 110 according to an embodiment of the present invention. As shown, the pressure vessel 110 includes a vessel liner 112 and a boss 114.

The vessel liner 112 is typically formed by a blow molding process as is known in the art. However, other molding and forming methods may be used to produce the vessel liner 112 such as injection molding, stretch molding, blow molding, and rotational molding, for example. As a non-limiting example, the vessel liner 112 is formed from a thermoplastic material. However, other plastics and non-metallic materials may be used. It is understood that the vessel liner 112 may be formed using a multilayer or single layer material structure and may further include a barrier layer, for example.

The boss 114 includes an inner boss 116, referred to as a clamped component, and an outer boss 118. The inner boss 116 and the outer boss 118 cooperate to define a passage 120 to provide a fluid communication between a pressure chamber formed in the pressure vessel 110 and an environment outside the pressure vessel 110. It is understood that the passage 120 may have any size, diameter, and shape.

The inner boss 116 is typically formed from a metal. However, other materials such as plastic, rubber, and resin based materials may be used. An inner surface 124 of the inner boss 116 includes a coupling element 126 for engaging and securing the inner boss 116 with the outer boss 118. As a non-limiting example, the coupling element 126 shown is a substantially helical thread or groove. However, other means for engaging and securing the inner boss 116 and the outer boss 118 may be used. As a non-limiting example, an outer surface 125 of the inner boss 116 abuts a portion of the outer boss 118. It is understood that the coupling element 126 may be formed on the outer surface 125 for engaging and securing the inner boss 116 with the outer boss 118.

As shown, the inner boss 116 is in a "clamped" position and has a substantially inverted "U" shape having a liner channel 122 for receiving the vessel liner 112 therein. However, it is understood that the inner boss 116 may be formed to have a substantially inverted "V" shape, wherein a width of the liner channel 122 is pre-determined to receive a portion of the vessel liner 112. It is further understood that the liner channel 122 may be adapted to secure a vessel liner having an inconstant wall thickness. As shown, the liner channel 122 includes a plurality of protrusions 128 or teeth to engage the vessel liner 112 and secure the vessel liner 112 therein. Additionally, a sealing material 130 is disposed in the liner channel 122 to provide a substantially fluid-tight seal between the inner boss 116 of the boss 114 and the vessel liner 112. As a non-limiting example, the liner channel 122 may have a serpentine or "wavy" shape to bend the vessel liner 12 in alternating directions. However, it is understood that the liner channel 122 may have any shape and size and may include any number of retaining elements such as the protrusions 128, for example. It is further understood that the inner boss 116 may include a sealing element (not shown) to provide a fluid-tight seal between the inner boss 116 and the vessel liner 112.

The outer boss 118 is typically formed from a metal. However, other materials such as plastic, rubber, and resin based materials may be used. The outer boss 118 includes a neck portion 132 and a shoulder portion 134. It is understood that the neck portion 132 and the shoulder portion 134 may have any shape and size.

As shown, the neck portion 132 of the outer boss 118 has a substantially inverted "J" shape and includes an inner boss channel 135 for receiving the inner boss 116 of the boss 114. A first surface 136 of the neck portion 132 includes a first coupling element 138. The first coupling element 138 engages and secures various utility devices such as pressure regulators, nozzles, valves, gauges, tubes, and similar fixtures which direct and control fluid flow in and out of the pressure vessel 110. As a non-limiting example, the first coupling element 138 shown is a substantially helical thread or groove formed on the first surface 136 of the neck portion 132. However, other means for engaging and securing the utility devices and the boss 114 may be used. A second surface 140 of the neck portion 132 includes a second coupling element 142 for engaging the coupling element 126 of the inner boss 116. As a non-limiting, the second coupling element 142 of the outer boss 118 shown is a substantially helical thread or groove. However, other means for engaging and securing the inner boss 116 and the outer boss 118 may be used. It is understood that the second coupling element 142 may be formed on any surface of the outer boss 118.

The shoulder portion 134 of the outer boss 118 is shown having a tapered shape with a decreasing thickness toward a periphery thereof. However, it is understood that the shoulder portion 134 may have any shape, size, and configuration as desired. As a non-limiting example, the shoulder portion 134 may be formed to contour to a portion of the vessel liner 112 and provide a substantially smooth transition between the shoulder portion 134 and an outer surface 137 of the vessel liner 112.

The outer boss 118 further includes a sealing channel 144 formed therein, wherein the sealing channel 144 is adapted to receive a sealing element 146. As shown, the outer boss 118 includes a single channel. However, any number of channels and sealing elements may be used. As a non-limiting example, the sealing element 146 is an O-ring formed from at least one of an elastomer and a plastic. However, other materials having desired characteristics may be used such as a rubber, a metal, and an ultra high molecular weight polyethylene (UHMW-PE), for example. As a further example, an encapsulated O-ring may be used, wherein the encapsulated O-ring includes multiple layers formed from various materials such as fluorinated ethylene propylene, fluoroelastomers (FKM), and methyl-vinyl silicone rubber (VMQ), for example.

In use, a parison (not shown) of the vessel liner 112 is guided around a blow pin, as known in the art of blow molding. Thereafter, the blow pin introduces air into the parison, thereby expanding the parison into the hollow vessel liner 112. It is understood that other gases or fluids may be used to form the hollow vessel liner 112. After the vessel liner 112 has a desired form, the formed vessel liner 112 is released and any scrap material of the parison is removed by a cutting process known to one skilled in the art of blow molding. It is understood that other blow molding processes may be used to form the vessel liner 112. It is further understood that other molding processes may be used to form the vessel liner 112, such as injection molding and stretch molding known in the art.

Once the vessel liner 112 is formed, a portion of the vessel liner 112 is disposed in the liner channel 122 of the inner boss 116. In certain embodiments, the inner boss 116 having a substantially "V" shape receives a portion of the vessel liner 112 into the liner channel 122. As such, the expanded width or "mouth" of the liner channel 122 allows the vessel liner 112 to be disposed therein. Thereafter, the inner boss 116 is clamped around the vessel liner 112 to squeeze the vessel liner 112 therein. As such, the protrusions 128 engage the vessel liner 112 to secure the vessel liner 112 to the inner boss 116. It is understood that any clamping tool may be used to bend the inner boss 116 and thereby "clamp" the vessel liner 112 therein. It is further understood that the vessel liner 112 may be heated prior to the clamping procedure to provide for a more pliable liner material. In certain embodiments, the sealing material 130 is injected into a space between the vessel liner 112 and the inner boss 116. In other embodiments, the sealing material 130 is disposed in the liner channel 122 prior to being clamped to the vessel liner 122. It is understood that any means for applying the sealing material 130 may be used. The outer boss 118 is then coupled to the inner boss 116. As a non-limiting example, the shoulder portion 134 of the outer boss 118 abuts a portion of the vessel liner 112. In certain embodiments, once the inner boss 116 and the outer boss 118 are coupled together, a utility device or support ring (not shown) is coupled to the first coupling element 138 of the outer boss 118 to provide additional support to the boss 114 and direct and control fluid flow in and out of the pressure vessel 110. It is understood that additional coatings and layers such as composites and fibers may be applied to the vessel liner 112 to form a final pressure vessel. As a non-limiting example, the addition layers formed around the vessel liner 112 may be formed by at least one of a winding process, a rotational molding process, and a curing process known in the art. It is further understood that the vessel liner 112 and resultant pressure vessel may have any shape and size determined by the forming process.

The invention provides a boss 14, 14', 14", 114 for use with a pressure vessel 10, 10', 10", 110 and a method for coupling the boss 14, 14', 14", 114 to a vessel liner 12, 112 of the pressure vessel 10, 10', 10", 110, wherein the boss 14, 14', 14", 114 is securely coupled to the vessel liner 12, 112 to form a substantially fluid-tight seal therebetween. Accordingly, the boss 14, 14', 14", 114 may be coupled to the vessel liner 12, 112 after the vessel liner 12, 112 is formed, thereby providing for most flexibility in the manufacturing of the vessel liner 12, 112.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for producing a pressure vessel, the method comprising the steps of:
   forming a vessel liner with an aperture formed therein;
   providing an inner boss having an inner surface, an outer surface, and a liner channel formed integrally therein, the liner channel adapted to receive a portion of the vessel liner therein, wherein the liner channel has a substantially serpentine shape including alternating curved protrusions and curved recesses for bending and securing the vessel liner within the inner boss;
   disposing a portion of the vessel liner in the liner channel of the inner boss;
   clamping the portion of the vessel liner within the liner channel of the inner boss; and
   providing an outer boss secured to the inner boss;
   wherein:
      the inner surface of the inner boss forms a passage having a coupling element adapted to receive and engage a utility device therein; or
      the outer boss includes an inner boss channel for receiving the inner boss,
      wherein the inner surface and the outer surface of the inner boss are disposed adjacent a portion of the inner boss channel.

2. The method according to claim 1, further comprising attaching one of a utility device and a support ring to the coupling element on the inner surface of the inner boss.

3. The method according to claim 1, wherein the outer boss abuts the vessel liner.

4. The method according to claim 1, wherein the outer boss has a neck portion and a shoulder portion, the shoulder portion having a tapered shape with a decreasing thickness toward a periphery thereof.

5. The method according to claim 1, further comprising a sealing element disposed between the inner boss and the outer boss to provide a fluid-tight seal therebetween.

6. The method according to claim 1, further comprising a sealing element disposed between the inner boss and the vessel liner to provide a fluid-tight seal therebetween.

7. The method according to claim 1, further comprising a first coupling element formed on the inner boss and a second coupling element formed on the outer boss, wherein the first coupling element engages the second coupling element to secure the inner boss with the outer boss.

8. The method according to claim 1, wherein the liner channel of the inner boss includes at least one protrusion for engaging and securing the vessel liner to the inner boss.

9. The method according to claim 1, further comprising a sealing material disposed in the liner channel of the inner boss to provide a fluid-tight seal between the vessel liner and the inner boss.

10. The method according to claim 1, wherein forming a vessel liner with an aperture formed therein comprises guiding a parison around a blow pin and expanding the parison into a hollow vessel liner.

11. The method according to claim 1, wherein forming a vessel liner with an aperture formed therein comprises one of injection molding and stretch molding the vessel liner.

12. The method according to claim 1, further comprising injecting a sealing material between the vessel liner and the inner boss.

13. The method according to claim 1, further comprising applying a layer to the vessel liner, wherein the layer comprises one of a composite and a fiber.

14. The method according to claim 13, wherein the applying comprises one of a winding process, a rotational molding process, and a curing process.

15. A method for producing a pressure vessel, the method comprising the steps of:
   forming a vessel liner with an aperture formed therein;
   providing an inner boss having an inner surface, an outer surface, and a liner channel formed integrally therein, the liner channel adapted to receive a portion of the vessel liner therein;
   heating the vessel liner to provide a pliable vessel liner
   clamping the portion of the vessel liner within the liner channel of the inner boss; and
   providing an outer boss secured to the inner boss;
   wherein:
      the inner surface of the inner boss forms a passage having a coupling element adapted to receive and engage a utility device therein; or
      the outer boss includes an inner boss channel for receiving the inner boss,
      wherein the inner surface and the outer surface of the inner boss are disposed adjacent a portion of the inner boss channel.

16. A method for producing a pressure vessel, the method comprising the steps of:
   forming a vessel liner with an aperture formed therein;
   providing an inner boss having an inner surface, an outer surface, and a liner channel formed integrally therein, wherein the liner channel divides the inner boss into an inner flange portion and an outer flange portion and is adapted to receive a portion of the vessel liner therein
   disposing a portion of the vessel liner in the liner channel of the inner boss;
   clamping the portion of the vessel liner within the liner channel of the inner boss by deforming the inner boss by bending the inner flange portion of the inner boss toward the outer flange portion of the inner boss to secure the portion of the vessel liner therebetween, securing the portion of the vessel liner in the liner channel; and
   providing an outer boss secured to the inner boss;
   wherein:
      the inner surface of the inner boss forms a passage having a coupling element adapted to receive and engage a utility device therein; or
      the outer boss includes an inner boss channel for receiving the inner boss,
      wherein the inner surface and the outer surface of the inner boss are disposed adjacent a portion of the inner boss channel.

17. The method according to claim 16, wherein the liner channel of the inner boss includes at least one protrusion for engaging and securing the portion of the vessel liner within the liner channel after the inner flange portion of the inner boss is bent toward the outer flange portion of the inner boss.

18. The method according to claim 16, wherein prior to the clamping step the liner channel is substantially V-shaped with a widened mouth for receiving the portion of the vessel liner, and after the clamping step the inner boss is deformed to cause the liner channel to remain substantially U-shaped with a smaller width of the mouth of the liner channel to retain the portion of the vessel liner therein.

* * * * *